(12) United States Patent
Yim

(10) Patent No.: US 10,027,903 B2
(45) Date of Patent: Jul. 17, 2018

(54) METHOD OF ARRANGING IMAGE FILTERS, COMPUTER-READABLE STORAGE MEDIUM ON WHICH METHOD IS STORED, AND ELECTRONIC APPARATUS

(71) Applicant: Samsung Electronics Co., Ltd., Suwon-si, Gyeonggi-do (KR)

(72) Inventor: Hyun-Ock Yim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/901,535

(22) PCT Filed: Jul. 16, 2014

(86) PCT No.: PCT/KR2014/006464
§ 371 (c)(1),
(2) Date: Dec. 28, 2015

(87) PCT Pub. No.: WO2015/009067
PCT Pub. Date: Jan. 22, 2015

(65) Prior Publication Data
US 2016/0142649 A1    May 19, 2016

(30) Foreign Application Priority Data
Jul. 16, 2013 (KR) .................. 10-2013-0083573

(51) Int. Cl.
*H04N 5/262* (2006.01)
*H04N 5/232* (2006.01)
(Continued)

(52) U.S. Cl.
CPC ............ *H04N 5/2621* (2013.01); *G06T 5/00* (2013.01); *H04N 1/00161* (2013.01);
(Continued)

(58) Field of Classification Search
CPC ............ H04N 5/2621; H04N 5/23216; H04N 5/23229; H04N 5/23222; H04N 5/23293;
(Continued)

(56) References Cited

U.S. PATENT DOCUMENTS 8,520,028 B1 * 8/2013 Freyhult ............... G06F 3/0481
345/661
8,878,963 B2   11/2014 Prabhudesai et al.
(Continued)

FOREIGN PATENT DOCUMENTS

CN    102752477 A    10/2012
CN    102761687 A    10/2012
(Continued)

OTHER PUBLICATIONS

Adobe: "Using Adobe Photoshop CS5", Jan. 1, 2011, XP002766307.

*Primary Examiner* — Pritham Prabhakher
(74) *Attorney, Agent, or Firm* — Jefferson IP Law, LLP

(57) ABSTRACT

A method of arranging image filters and associated apparatus and storage media are provided. The method includes determining an arrangement order determination criterion based on a user input, searching for image filters based on the arrangement order determination criterion, arranging the searched image filters according to the arrangement order determination criterion, and displaying the arranged image filters on a display unit of an electronic apparatus.

14 Claims, 15 Drawing Sheets

(51) Int. Cl.
*G06T 5/00* (2006.01)
*H04N 1/00* (2006.01)
*H04N 5/235* (2006.01)

(52) U.S. Cl.
CPC ..... *H04N 1/00413* (2013.01); *H04N 5/23216* (2013.01); *H04N 5/23229* (2013.01); *H04N 5/2355* (2013.01); *H04N 5/23222* (2013.01); *H04N 5/23293* (2013.01)

(58) Field of Classification Search
CPC ............. H04N 5/2355; H04N 5/23219; H04N 5/2256; H04N 1/3872; H04N 1/40006; H04N 1/6091; H04N 1/62; G06T 5/00; G06T 5/002; G06T 5/50; G06T 5/20; G06T 5/008; G06T 11/60; G06T 2207/10024; G06T 2207/20012; G06T 13/80; G06K 9/00281; G06K 9/00
USPC ....................................................... 348/239
See application file for complete search history.

(56) References Cited

U.S. PATENT DOCUMENTS

| | | | |
|---|---|---|---|
| 8,885,068 B2 | 11/2014 | Kim et al. | |
| 9,049,363 B2 | 6/2015 | Choi et al. | |
| 9,154,709 B2* | 10/2015 | Cohen | H04N 5/23293 |
| 9,258,458 B2* | 2/2016 | Gann | G06K 9/00624 |
| 9,270,867 B2 | 2/2016 | Kim et al. | |
| 9,424,653 B2* | 8/2016 | Gupta | G06T 7/0085 |
| 2005/0206775 A1* | 9/2005 | Shiohara | G03B 17/18 348/360 |
| 2007/0081740 A1* | 4/2007 | Ciudad | H04N 1/00286 382/276 |
| 2009/0319897 A1* | 12/2009 | Kotler | G06F 3/04845 715/711 |
| 2010/0289924 A1 | 11/2010 | Koshikawa et al. | |
| 2012/0242852 A1* | 9/2012 | Hayward | H04N 5/23212 348/222.1 |
| 2012/0243748 A1 | 9/2012 | Ciudad et al. | |
| 2012/0262473 A1 | 10/2012 | Kim et al. | |
| 2012/0307103 A1* | 12/2012 | Kunishige | H04N 5/23245 348/223.1 |
| 2012/0314919 A1* | 12/2012 | Sparks | G06F 19/321 382/128 |
| 2013/0083219 A1* | 4/2013 | Heo | H04N 5/23216 348/231.6 |
| 2013/0229439 A1* | 9/2013 | Freyhult | G06F 3/0481 345/661 |
| 2014/0176732 A1* | 6/2014 | Cohen | H04N 5/23293 348/207.1 |

FOREIGN PATENT DOCUMENTS

| | | |
|---|---|---|
| EP | 2518997 A2 | 10/2012 |
| JP | 2005-175580 A | 6/2005 |
| KR | 10-1223784 B1 | 1/2013 |
| KR | 10-2013-0063310 A | 6/2013 |
| KR | 10-2013-0077726 A | 7/2013 |

* cited by examiner

FIG. 6

| PARAMETER #1 | PARAMETER #2 | PARAMETER #3 | PARAMETER #4 | PARAMETER #5 | PARAMETER #6 | PARAMETER #7 | PARAMETER #8 |
|---|---|---|---|---|---|---|---|
| PARAMETER VALUE #1 | PARAMETER VALUE #2 | PARAMETER VALUE #3 | PARAMETER VALUE #4 | PARAMETER VALUE #5 | PARAMETER VALUE #6 | PARAMETER VALUE #7 | PARAMETER VALUE #8 |

600

610 → (top row)
620 → (bottom row)

| FILTER NAME | FILTER GENERATION DATE | FEMALE PREFERENCE | MALE PREFERENCE | SELECTION FREQUENCY | PREFERENCE ACCORDING TO AGE | COLOR INFORMATION | SATURATION | CONTRAST | HISTOGRAM | EV |
|---|---|---|---|---|---|---|---|---|---|---|
| IMAGE FILTER#1 | 20120302 | 20 | 80 | 500 | 100030020 | RED | 60 | 80 | 30 | -2 |
| IMAGE FILTER#2 | 20120302 | 80 | 20 | 230 | 20030095 | BLUE | 20 | 90 | 10 | 3 |

710 → FILTER NAME row
720 → IMAGE FILTER#1 row
730 → IMAGE FILTER#2 row

| FILTER NAME | FILTER GENERATION DATE | FEMALE PREFERENCE | MALE PREFERENCE | SELECTION FREQUENCY | PREFERENCE ACCORDING TO AGE | COLOR INFORMATION | SATURATION | CONTRAST | HISTOGRAM | EV |
|---|---|---|---|---|---|---|---|---|---|---|
| IMAGE FILTER#3 | 20130102 | 30 | 70 | 10 | 100030020 | GREEN | 80 | 50 | 20 | -1 |
| IMAGE FILTER#4 | 20130402 | 70 | 30 | 5 | 20030095 | YELLOW | 10 | 90 | 10 | 3 |

810 → FILTER NAME row
820 → IMAGE FILTER#3 row
830 → IMAGE FILTER#4 row

METHOD OF ARRANGING IMAGE FILTERS, COMPUTER-READABLE STORAGE MEDIUM ON WHICH METHOD IS STORED, AND ELECTRONIC APPARATUS

CROSS-REFERENCE TO RELATED APPLICATION(S)

This application is a U.S. National Stage application under 35 U.S.C. § 371 of an International application filed on Jul. 16, 2014 and assigned application number PCT/KR2014/006464, which claimed the benefit of a Korean patent application filed on Jul. 16, 2013 in the Korean Intellectual Property Office and assigned Serial number 10-2013-0083573, the entire disclosure of which is hereby incorporated by reference.

TECHNICAL FIELD

The disclosure relates to a method of arranging image filters, a computer-readable storage medium on which the method is stored, and a digital photographing apparatus.

BACKGROUND

Digital cameras, which have been recently put on the market, are easy to operate and thus are already largely popular. Accordingly, customers put emphasis on a method of using digital image processing technology.

Existing image processing apparatuses employ filters for applying effects of a general nature, including color, art filters, and the like, to a digital image Such filters are provided as an application or an internal function of the image processing apparatuses so that a user is able to easily use the filters. However, the number of types of image filters for image processing, such as a sense of color or coloring, an art filter, and the like, may be hundreds to tens of thousands, depending on the preferences of users, and an impression after applying each filter may vary according to an object photographed or to be photographed, and thus, tens of filters are usually provided.

To satisfy most users or to apply a filter that is suitable for a situation, it is very useful to provide tens to hundreds of filters. However, according to existing technology, many filters are randomly displayed without special conditions. Thus, a user must apply filters provided by an electronic apparatus in a one-by-one fashion while moving the filters to view other filters, to find a desired filter or a filter that is most suitable for a captured image.

Accordingly, since the existing electronic apparatuses randomly display many filters on a display unit without special conditions, it takes too much time for a user to select a desired filter and apply the selected filter to a digital image. This problem occurs both before and after photographing, and if the above operations are performed before photographing, it takes too much time before photographing, and thus, it is not easy to take a picture.

In addition, since too many filters are maximally displayed on one screen, filter effects are not perceived well, and thus it is not easy to identify each filter.

Other aspects, advantages, and salient features of the disclosure will become apparent to those skilled in the art from the following detailed description, which, taken in conjunction with the annexed drawings, discloses various embodiments of the present disclosure.

SUMMARY

Aspects of the present disclosure are to address at least the above-mentioned problems and/or disadvantages and to provide at least the advantages described below. Accordingly, an aspect of the present disclosure is to provide a method of arranging filters for choosing a suitable image filter.

In accordance with an aspect of the disclosure, a method of arranging image filters is provided. The method includes determining an arrangement order determination criterion based on a user input, searching for image filters based on the arrangement order determination criterion, arranging the searched image filters according to the arrangement order determination criterion, and displaying the arranged image filters on a display unit of an electronic apparatus.

The determining of the arrangement order determination criterion may include determining an arrangement order of the searched image filters based on parameter values defining each image filter.

The determining of the arrangement order determination criterion may include determining the arrangement order determination criterion based on an input image selected by the user or a partial region selected by the user from an input image.

The method may further include providing a user interface for allowing the user to select the arrangement order determination criterion.

The searching for the image filters based on the arrangement order determination criterion may include searching for image filters having parameter values corresponding to the arrangement order determination criterion.

The arranging of the searched image filters according to the arrangement order determination criterion may include arranging the searched image filters so that an image filter having a high similarity between the arrangement order determination criterion and parameter values corresponding to each image filter has a high priority.

The method may further include generating an image filter based on a user input, wherein the arranging of the searched image filters according to the arrangement order determination criterion includes arranging image filters so that the image filter generated by the user has a high priority if the arrangement order determination criterion is associated with the user.

The method may further include determining the maximum number of image filters to be displayed on the display unit.

The displaying of the arranged image filters on the display unit of the electronic apparatus may include displaying the image filters with effects thereof.

In accordance with another aspect of the disclosure, an apparatus for processing a digital image is provided. The apparatus includes an arrangement order determination unit configured to determine an arrangement order determination criterion based on a user input, an image filter search unit configured to search for image filters based on the arrangement order determination criterion, an image filter arrangement unit configured to arrange the searched image filters according to the arrangement order determination criterion, and a display unit configured to display the arranged image filters.

The arrangement order determination unit may be further configured to determine an arrangement order of the searched image filters based on parameter values defining each image filter.

The arrangement order determination unit may be further configured to determine the arrangement order determination criterion based on an input image selected by the user or a partial region selected by the user from an input image.

The apparatus may further include a user interface providing unit configured to provide a user interface for allowing the user to select the arrangement order determination criterion.

The image filter search unit may be further configured to search for image filters having parameter values corresponding to the arrangement order determination criterion.

The image filter arrangement unit may be further configured to arrange the searched image filters so that an image filter having a high similarity between the arrangement order determination criterion and parameter values corresponding to each image filter has a high priority.

The apparatus may further include an image filter generation unit configured to generate an image filter based on the user input, wherein the image filter arrangement unit arranges image filters so that the image filter generated by the user has a high priority if the arrangement order determination criterion is associated with the user.

The display unit may be further configured to display the image filters with effects thereof.

The apparatus may further include a filter number determination unit configured to determine the maximum number of image filters to be displayed on the display unit based on the user input.

In accordance with another aspect of the disclosure, a non-transitory computer-readable storage medium that stores therein computer program codes, which, when read and executed by a processor, perform a method of arranging image filters is provided. The method includes determining an arrangement order determination criterion based on a user input, searching for image filters based on the arrangement order determination criterion, arranging the searched image filters according to the arrangement order determination criterion, and displaying the arranged image filters on a display unit of an electronic apparatus.

The determining of the arrangement order determination criterion may include determining an arrangement order of the searched image filters based on parameter values defining each image filter.

The determining of the arrangement order determination criterion may include determining the arrangement order determination criterion based on an input image selected by the user or a partial region selected by the user from an input image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6 to 8 are image filter tables showing parameters defining image filters and parameter values corresponding to the image filters according to various embodiments of the disclosure;

Throughout the drawings, it should be noted that like reference numbers are used to depict the same or similar elements, features, and structures.

DETAILED DESCRIPTION

Figure 1:
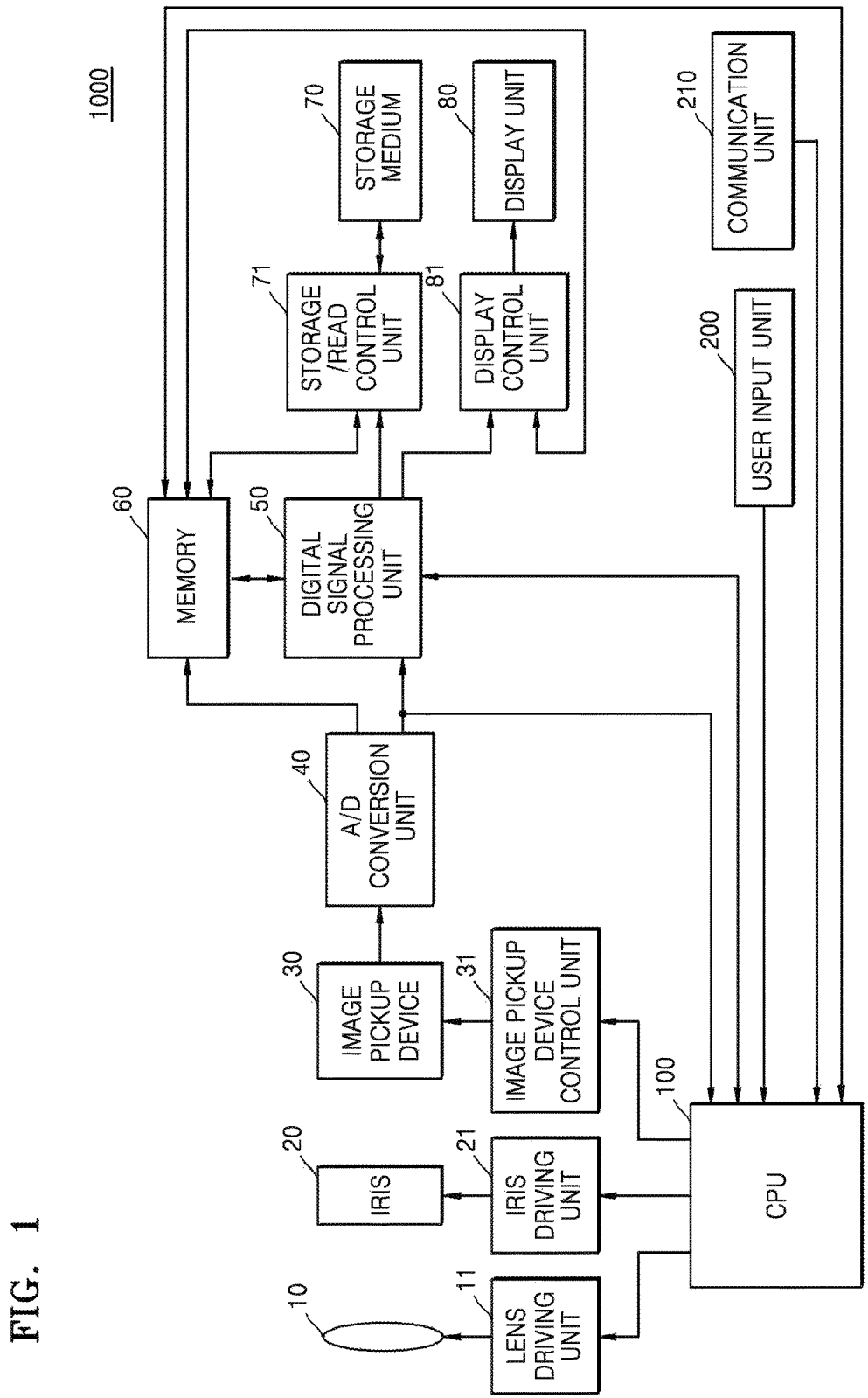
FIG. 1 is a block diagram of an electronic apparatus for processing an image according to an embodiment of the disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A method of arranging image filters comprising, determining an arrangement order determination criterion based on a user input, searching for image filters based on the arrangement order determination criterion, arranging the searched image filters according to the arrangement order determination criterion, and displaying the arranged image filters on a display unit of an electronic apparatus is provided.

Although terms, such as 'first' and 'second', can be used to describe various elements, the elements cannot be limited by the terms. The terms can be used to classify a certain element from another element.

The terminology used in this disclosure is used to describe various embodiments and does not have any intention to limit the inventive concept. An expression in the singular includes an expression in the plural unless they are clearly different from each other in context. In the application, it should be understood that terms, such as 'include' and 'have', are used to indicate the existence of an implemented feature, number, step, operation, element, part, or a combination thereof without excluding in advance the possibility of the existence or addition of one or more other features, numbers, steps, operations, elements, parts, or combinations thereof.

Reference will now be made to various embodiments, examples of which are illustrated in the accompanying drawings, wherein like reference numerals refer to like elements throughout. In this regard, the described embodiments may have different forms and should not be construed as being limited to the descriptions set forth herein. Accordingly, the various embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram of an electronic apparatus for processing an image according to an embodiment of the disclosure.

Referring to FIG. 1, a general operation of an electronic apparatus 1000 is controlled by a central processing unit (CPU) 100. In addition, the electronic apparatus 1000 includes a user input unit 200, which may include keys for generating an electrical signal from a user input and the like, as well as a communication unit 200 for external communication, such as communication to a server. The electrical signal is transmitted to the CPU 100 so that the CPU 100 controls the electronic apparatus 1000 according to the electrical signal.

In a photographing mode, when an electrical signal is input from the user to the CPU 100, the CPU 100 analyzes the electrical signal and controls a lens driving unit 11, an iris driving unit 21, and an image pickup device control unit 31 to control a position of a lens 10, a degree of opening of an iris 20, and the sensitivity of an image pickup device 30, respectively. The image pickup device 30 generates data related to an image from incident light, and an analog/digital (A/D) conversion unit 40 converts analog data output from the image pickup device 30 into digital data. The A/D conversion unit 40 may not be included according to characteristics of the image pickup device 30.

The data generated by the image pickup device 30 may be input to a digital signal processing unit 50 via a memory 60, input to the digital signal processing unit 50 without passing through the memory 60, or input to the CPU 100 according to circumstances. The memory 60 may include a read only memory (ROM), a random access memory (RAM), and the like. The digital signal processing unit 50 may perform digital signal processing, such as gamma correction, white balance adjustment, and the like, according to circumstances.

Figure 16:
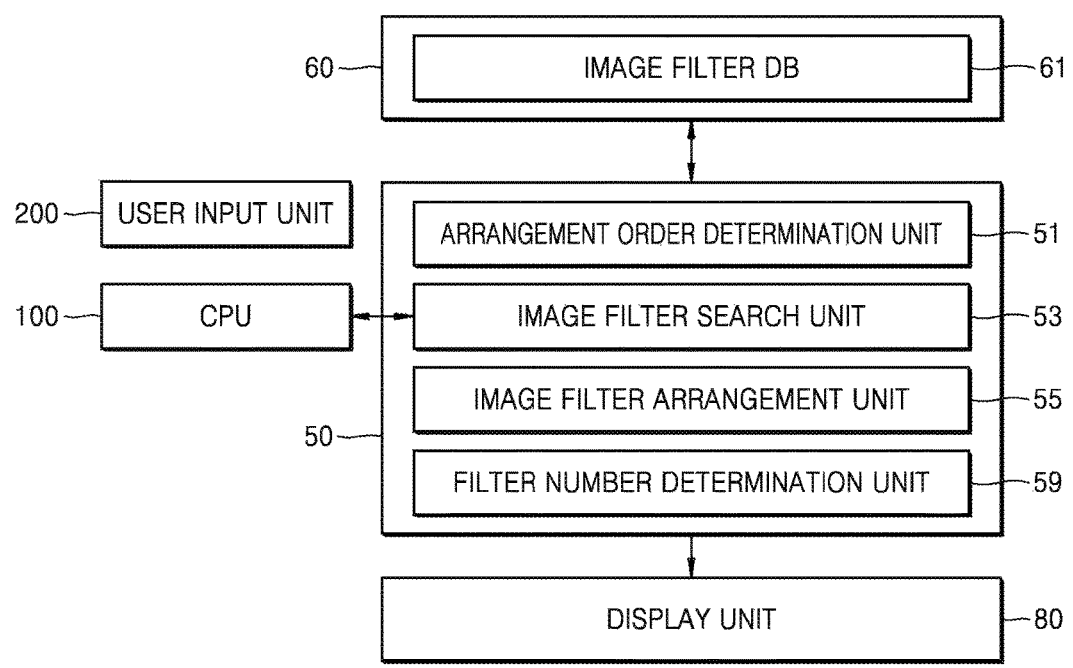
FIG. 16 is a block diagram of a digital signal processing unit in an electronic apparatus further including a filter number designation unit according to an embodiment of the disclosure.

According to an embodiment of the disclosure, the digital signal processing unit 50 may include an arrangement order determination unit 51 (refer to FIG. 3), an image filter search unit 53 (refer to FIG. 3), an image filter arrangement unit 55 (refer to FIG. 3), an image filter generation unit 57 (refer to FIG. 5), a user interface providing unit 58 (refer to FIG. 10), and a filter number determination unit 59 (refer to FIG. 16).

Image data output from the digital signal processing unit 50 is transmitted to a display control unit 81 via the memory 60 or directly. The display control unit 81 controls a display unit 80 to display an image thereon. In addition, the image data output from the digital signal processing unit 50 is input to a storage/read control unit 71 via the memory 60 or directly, and the storage/read control unit 71 automatically stores the image data in a storage medium 70 according to a signal from the user.

The storage/read control unit 71 may read data related to an image from an image file stored in the storage medium 70 and output the data to the display control unit 81 via the memory 60 or another path to thereby display the image on the display unit 80. The storage medium 70 may be detachably or permanently mounted in a digital photographing apparatus.

As described above, the electronic apparatus 1000 generates image data from light passing through the lens 10 and incident to the image pickup device 30 and finally stores a digital image file having the image data in the storage medium 70.

Each image filter may be defined by a combination of at least one parameter related to a user and at least one parameter related to an image. In addition, each image filter may have parameter values corresponding to the image filter. Examples of parameters defining each image filter will be described below with reference to FIGS. 6 to 8.

According to an embodiment of the disclosure, image processing is performed on an acquired input image according to a desired purpose in an electronic apparatus. The input image may be a preview image or an image stored in the storage medium 70. The input image may be manually input by an operation of a user or input from a web server over a network. For example, an image filter selected by the user may perform image processing on the input image based on parameter values corresponding to the image filter. In addition, the input image may be processed by applying a color conversion 3×3 matrix or the like. In addition, parameters defining the image filter or the parameter values corresponding to the image filter may be set based on a user input. According to an embodiment of the disclosure, the user may generate an image filter by using a user interface.

For example, the user may set parameters defining an image filter or parameter values corresponding to the image filter by using a user interface provided by an electronic apparatus. In addition, the user may change an effect of image processing by changing the parameters defining the image filter or the parameter values corresponding to the image filter through the user interface.

For example, the parameters defining the image filter may include setting items to be used for photographing or other various operations of the electronic apparatus.

An image processing effect corresponding to an image filter set by the user may influence both input images before and after photographing, according to parameters defining the image filter and parameter values corresponding to the image filter.

For example, when an image processing effect of an image filter influences imaging before photographing, parameters defining the image filter may include at least one selected from the group consisting of a shutter speed, an iris value, a color temperature, a photographing mode, white balance, exposure correction, color correction, flash light intensity adjustment, sensitivity adjustment, electronic zoom, a focal area change, and the like.

When an image processing effect of an image filter influences imaging after photographing, at least one selected from the group consisting of a pre-processing process and a post-processing process of a digital image acquired by the photographing may be included.

For example, parameters defining an image filter associated with a pre-processing process may include a synthesis method through continuous photographing with a high International Standards Organization (ISO) number for correcting shaking, a high dynamic range (HDR) method of a multi-sheet method for improving a dynamic range under a backlight condition and the like.

In addition, parameters defining an image filter associated with a post-processing process may include saturation, sharpness, brightness, contrast, Kelvin for white balance, an exposure value, hue, and the like. In addition, the parameters defining an image filter associated with a post-processing process may further include the HDR method capable of applying a dynamic range as one sheet, blurring using a Gaussian filter capable of removing blemishes on a face, and the like.

Figure 2:
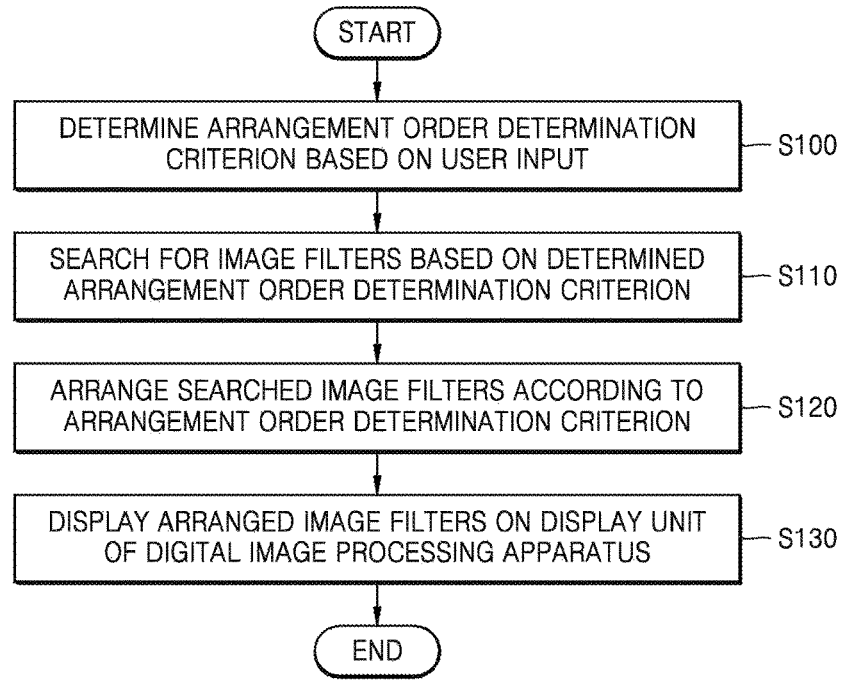
FIG. 2 is a flowchart of a method of arranging image filters according to an embodiment of the disclosure.

FIG. 2 is a flowchart of a method of arranging image filters according to an embodiment of the disclosure.

Referring to FIG. 2, an arrangement order determination criterion is determined based on a user input in operation S100. The arrangement order determination criterion only suggests image filters desired by the user to the user by arranging the image filters desired by the user on the display unit 80 instead of arranging all image filters stored in the memory 60 of the electronic apparatus 1000. For example, the arrangement order determination criterion may be associated with values of parameters defining image filters based on the user input.

In addition, an arrangement order of the searched image filters may be determined based on values of parameters defining each image filter.

In addition, the arrangement order determination criterion may be determined based on an input image selected by the user or a partial region selected by the user from an input image.

In operation S110, image filters are searched for based on the determined arrangement order determination criterion.

The parameter values may be stored in an image filter database (DB) 61 (refer to FIG. 3) of the electronic apparatus 1000.

Image filters having parameter values corresponding to the arrangement order determination criterion determined based on the user input in operation S100 may be searched for.

According to an embodiment of the disclosure, to reduce a search time to find a desired image filter by searching for many image filters one-by-one, only some image filters are searched for based on an arrangement order determination criterion determined by the user and/or suggested to the user to thereby allow the user to efficiently select a desired image filter.

Accordingly, compared with displaying many image filters on the display unit 60 at one time to find a desired image filter, a search time may be reduced by searching for image filters according to an arrangement order determination criterion selected by the user.

In operation S120, the searched image filters are arranged according to the arrangement order determination criterion.

The image filters searched for in operation S110 may be arranged so that an image filter having high similarity between the arrangement order determination criterion determined in operation S100 and parameter values corresponding to each image filter has a high priority.

For example, for female-male preference, child-adult preference, or age group preference, survey results are converted to percentages and stored, and it may be determined that a parameter having the highest percentage has the highest preference.

In operation S130, the arranged image filters are displayed on the display unit 80 of the electronic apparatus 1000.

When the arranged image filters are displayed on the display unit 80, effects of the arranged image filters may be displayed together.

The arranged image filters are suggested to the user by being displayed on the display unit 80.

According to an embodiment of the disclosure, since visually similar image filters are displayed as a group, the user may simply and intuitively select an image filter which meets a request of the user.

Figure 3:
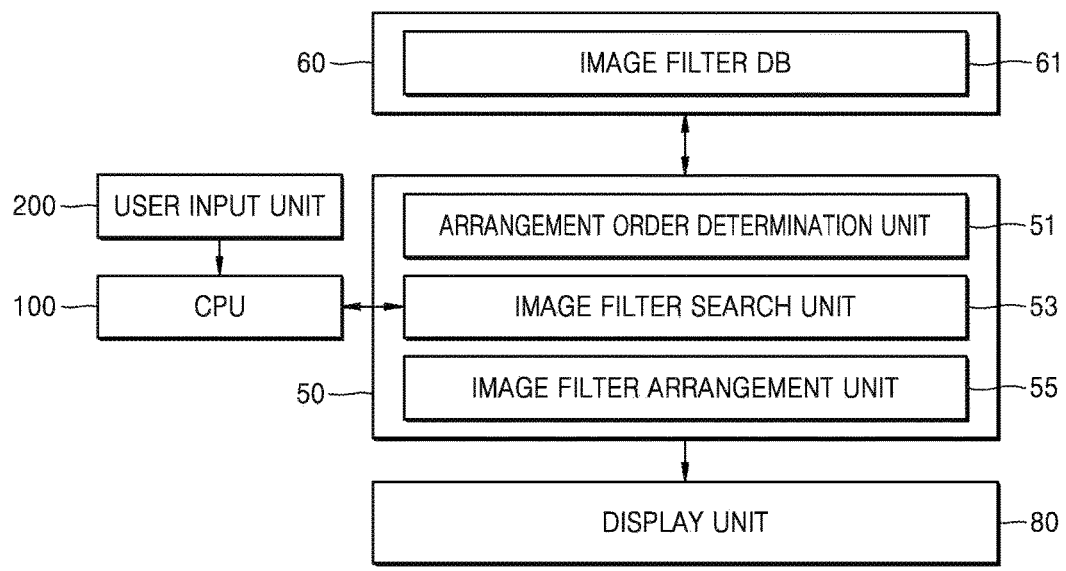
FIG. 3 is a block diagram of a digital signal processing unit in an electronic apparatus that arranges image filters according to an embodiment of the disclosure.

FIG. 3 is a block diagram of a digital signal processing unit in an electronic apparatus that arranges image filters according to an embodiment of the disclosure.

Referring to FIG. 3, the digital signal processing unit 50 includes the arrangement order determination unit 51, the image filter search unit 53, and the image filter arrangement unit 55. The memory 60 includes the image filter DB 61.

The arrangement order determination unit 51 determines an arrangement order determination criterion based on a user input. For example, the arrangement order determination unit 51 may determine an arrangement order of searched image filters based on values of parameters defining each image filter. The arrangement order determination unit 51 may determine the arrangement order determination criterion based on an input image selected by the user or a partial region selected by the user from an input image.

The image filter search unit 53 searches for image filters based on the arrangement order determination criterion determined by the arrangement order determination unit 51. The image filter search unit 53 may search for image filters having parameter values corresponding to the determined arrangement order determination criterion.

The image filter arrangement unit 55 arranges the image filters searched by the image filter search unit 53 according to the arrangement order determination criterion. The image filter arrangement unit 55 may arrange the image filters so that an image filter having high similarity between the determined arrangement order determination criterion and parameter values corresponding to each image filter has a high priority.

The user input unit 200 generates input data by which an operation of the electronic apparatus 1000 is controlled by the user. The user input unit 200 may include a keypad, a dome switch, a touch pad (capacitive overlay, resistive overlay, infrared beam, surface acoustic wave, integral strain gauge, piezoelectric, or the like), a jog wheel, a jog switch, and the like. In an embodiment, the touch pad and the display unit 80 that constitute a two-layer structure described below may be referred to as a touch screen. According to an embodiment of the disclosure, an arrangement order determination criterion may be selected through the user input unit 200.

The display unit 80 may include at least one selected from the group consisting of a liquid crystal display, a thin-film transistor liquid crystal display, an organic light-emitting diode display, a flexible display, a three-dimensional (3D) display, and the like.

When a touch screen is formed by a two-layer structure of the touch pad and the display unit 80, the display unit 80 may also be used as an input device besides an output device. The touch screen may be configured to detect not only a touch input position and a touch area but also a touch input pressure. The touch screen may be configured to detect not only an actual touch but also a proximity touch. According to an embodiment of the disclosure, when the display unit 80 displays an image filter, the display unit 80 may also display an effect of the image filter.

The memory 60 may store programs for processing and control by the digital signal processing unit 50 and temporarily store input/output data (e.g., a phone book, a message, a still image, a video, and the like).

The memory 60 may include at least one type of storage medium selected from the group consisting of a flash memory type memory, a hard disk type memory, a multimedia card micro type memory, a card type memory (e.g., a secure digital (SD) memory, an extreme digital (XD) memory, or the like), RAM, static RAM (SRAM), ROM, an electrically erasable programmable ROM (EEPROM), a programmable ROM (PROM), a magnetic memory, a magnetic disk, an optical disc, etc. The electronic apparatus 1000 may operate a web storage for performing a storage function of the memory 60 over the Internet.

According to an embodiment of the disclosure, the memory 60 may include the image filter DB 61. The image filter DB 61 stores image filter tables as shown in FIGS. 6 to 8, which show parameters defining image filters and parameter values corresponding to the image filters.

The CPU 100 generally controls a general operation of the electronic apparatus 1000. For example, the CPU 100 performs control and processing associated with an image filter arrangement.

Figure 4:
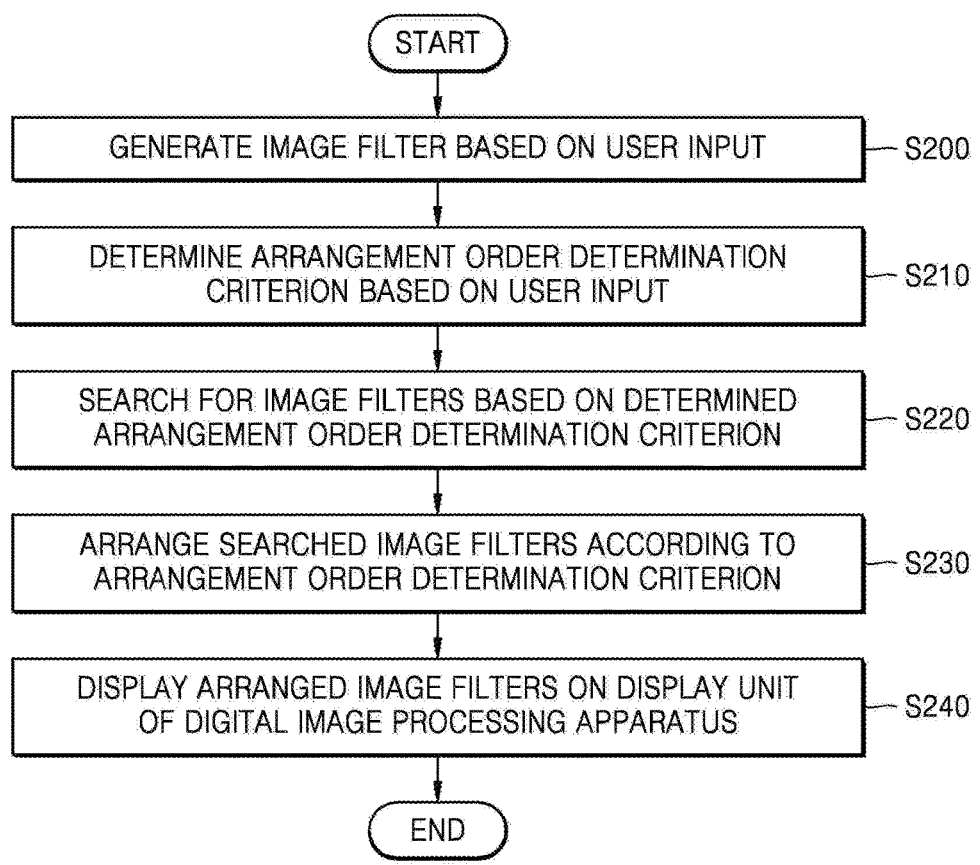
FIG. 4 is a flowchart of a method of generating an image filter based on a user input according to an embodiment of the disclosure.

FIG. 4 is a flowchart of a method of generating an image filter based on a user input according to an embodiment of the disclosure.

Figure 19:
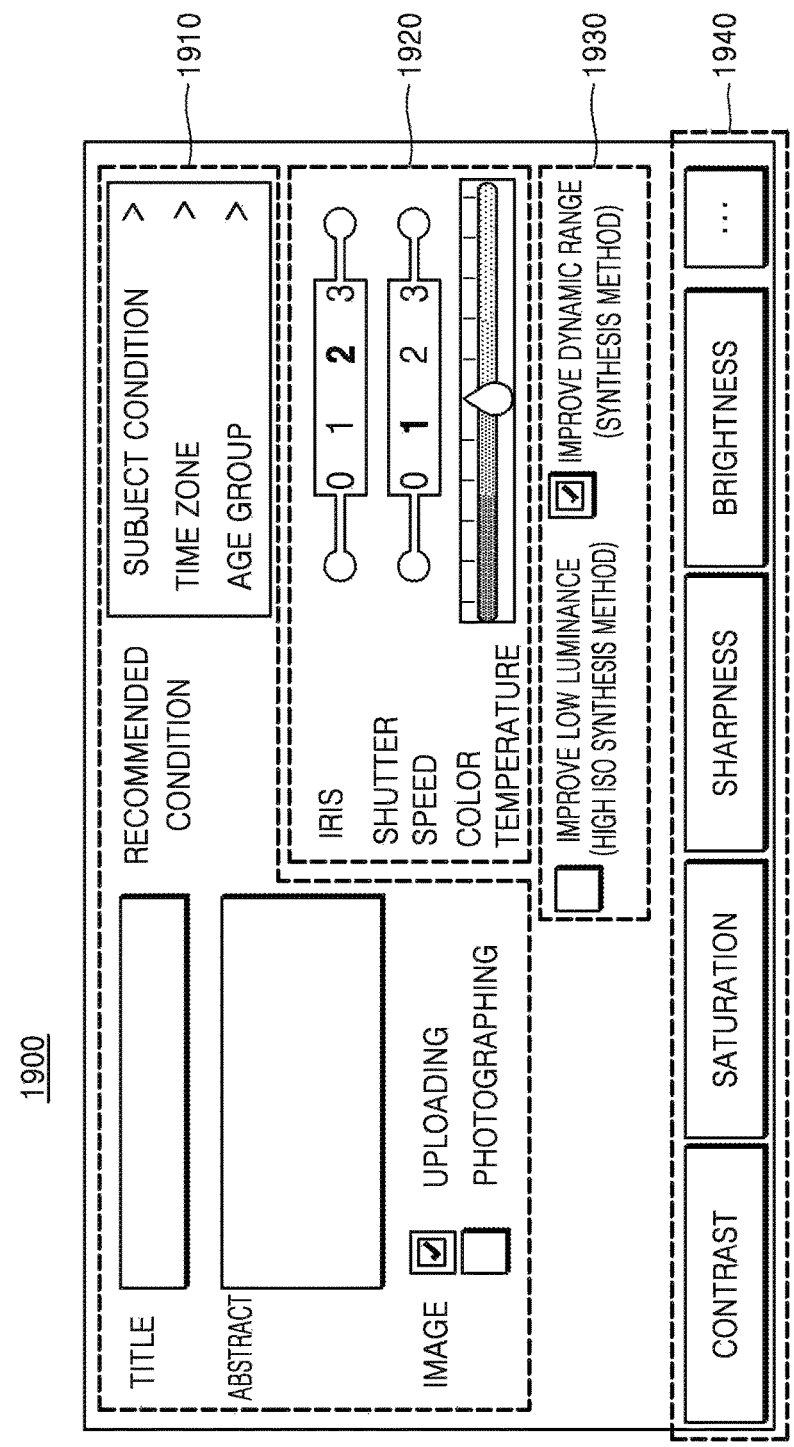
FIG. 19 is a user interface display illustrating a user interface for generating an image filter according to an embodiment of the disclosure.

Referring to FIG. 4, an image filter is generated based on a user input in operation S200. The user may directly input parameter values of an image filter to generate the image filter. The generated image filter has parameter values of hue, saturation, brightness, and the like selected by the user as values of parameters defining the image filter. For example, the user may generate an image filter by using a user interface provided by the electronic apparatus 1000. The user interface may generate parameters defining an image filter based on a user input and allow the user to input parameter values corresponding to the image filter. The user interface 1900 is illustrated in FIG. 19.

For example, each image filter may be defined by a combination of at least one parameter related to a user and at least one parameter related to an image. In addition, each image filter may have parameter values corresponding to the image filter.

For example, the at least one parameter related to a user may include a filter name, a filter generation date, a maker, female preference (%), male preference (%), a selection frequency, an age group, and the like, and the at least one parameter related to an image may include color sense, sharpness, silhouette, and the like.

The generated image filter may be stored in the image filter DB 61 of the memory 60 in the electronic apparatus 1000 to be used later or may be uploaded to a server via a communication unit (e.g., 210 of FIG. 1). The generated image filter may be stored in an external memory, such as an SD card or the like.

Data on a space in which the image filter is stored may also be an arrangement order determination criterion.

In operation S210, an arrangement order determination criterion is determined based on an input. Operation S210 is substantially the same as operation S100 of FIG. 2.

In operation S220, image filters are searched for based on the determined arrangement order determination criterion. Operation S220 is substantially the same as operation S110 of FIG. 2.

In operation S230, the searched image filters are arranged according to the determined arrangement order determination criterion. Operation S230 is substantially the same as operation S120 of FIG. 2.

In operation S230, when the determined arrangement order determination criterion is related to the user, the searched image filters may be arranged so that the image filter generated by the user has a high priority. For example, when the determined arrangement order determination criterion is related to a user name, USER1 may be selected from among parameter values related to "user name" based on a user input.

In operation S240, the arranged image filters are displayed on the display unit 80 of the electronic apparatus 1000. Operation S240 is substantially the same as operation S130 of FIG. 2.

For example, only image filters generated by a user corresponding to the selected parameter value USER1 are arranged and displayed on the display unit 80.

Figure 5:
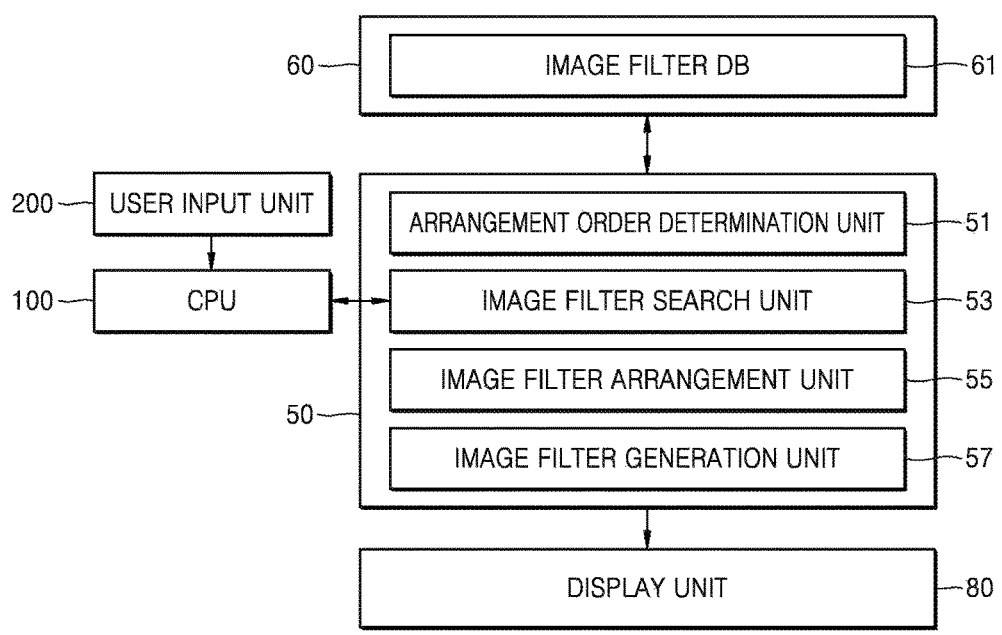
FIG. 5 is a block diagram of a digital signal processing unit in an electronic apparatus for generating an image filter according to an embodiment of the disclosure.

FIG. 5 is a block diagram of a digital signal processing unit in an electronic apparatus for generating an image filter according to an embodiment of the disclosure.

Referring to FIG. 5, the digital signal processing unit 50 may further include an image filter generation unit 57.

The image filter generation unit 57 generates an image filter based on a user input.

When a determined arrangement order determination criterion is related to the user, the image filter arrangement unit 55 may arrange image filters so that the image filter generated by the user has a high priority.

FIG. 6 illustrates an image filter table having parameters defining image filters and parameter values corresponding to the image filters according to an embodiment of the present disclosure.

Referring to FIG. 6, each image filter may be defined by a combination of at least one parameter related to a user and at least one parameter related to an image. In the example of FIG. 6, image filters 610 and 620 are shown, each having eight parameter values. In addition, each image filter may have parameter values corresponding to the image filter.

According to an embodiment of the disclosure, parameter values corresponding to each image filter may be formed and stored in a table format with respect to parameters defining each image filter. This may be referred to as an image filter table, and the image filter table may be stored in the image filter DB 61 of the memory 60. Every image filter may have an image filter table having unique parameter values. Every time an image filter is added by the user, a corresponding image filter table may also be added.

For example, at least one parameter related to a user may include a filter name, a filter generation date, a maker, female preference (%), male preference (%), a selection frequency, an age group, and the like, and at least one parameter related to an image may include color sense, sharpness, silhouette, and the like.

The parameters of the filter name, the filter generation date, and the maker may be input in a text format based on a user input. A preference according to a gender, such as the female preference (%), the male preference (%), or the like, may be designated in advance as a parameter value in an image filter table by providing an image filter as a sample in advance by a developer and converting a filter preference survey result to a percentage (%). For example, filter preference may include personal preference or preference of other people. In addition, when the electronic apparatus 1000 is communicable with a server over a network, the preference according to a gender or the selection frequency may be converted based on the number of downloads of an image filter from the server to at least one electronic apparatus.

According to an embodiment of the disclosure, the selection frequency may be stored as the number of selections by counting a selection every time an image filter is actually selected by the user based on a user input from a permanent memory, such as EEPROM.

For example, the personal preference may be defined by gradually increasing a value of the selection frequency (count value) every time the user selects the image filter. The value of the selection frequency may be stored in EEPROM or the like that is a memory for permanently recording values in the electronic apparatus 1000 even when there is no separate server.

The preference of other people may include preference according to an age group, preference according to a gender, preference according to an age group and a gender, and the like. If another person, who is a teenager, has selected a certain image filter, a value of the selection frequency (count value) corresponding to teenagers in the preference according to an age group from among parameters defining the certain image filter may increase by 1 as a parameter value.

If another person, who is a female, has selected a certain image filter, a value of the selection frequency (count value) corresponding to the female preference from among parameters defining the certain image filter may increase by 1 as a parameter value.

For example, information on gender or ages of other people may be input through the electronic apparatus 1000.

In addition, information related to the user may be stored in a server or a portable memory, such as an SD card, and updated according to circumstances.

For the color sense of a digital image, an RGB color model, a YIQ color model, a CMY color model, an HIS color model, or the like may be used.

The RGB color model is a color model used in the color cathode-ray tube (CRT) monitor field and the computer graphics field, the YIQ color model is a color model for TV broadcasting, and the CMY color model is a color model used for printers to output a color image. The HIS color model is an intuitive color model that is close to a color model by which people recognize colors and is used for systems dealing with hue, saturation, and brightness (HSB).

According to an embodiment of the disclosure, the color sense of an image filter may be defined as a biased color in a state where a subject of an achromatic color does not exist in a color domain, such as HSB. Alternatively, the color sense may be directly input from a color sense category based on a user input. Conversion to the color domain may be performed by calculating a color value by using an equation below according to an arrangement configuration based on the color sense.

For arrangement of image filters based on the color sense, an index value of a color (color index) to be most biased when an image filter is actually applied may be stored. For the color index, the user may directly input the color sense after an image is processed by the image filter in the image filter table by defining a main color based on the three primary colors, such as red, yellow, and blue. Since the user may know a biased color when generating an image filter, a color index of a color closest to the biased color may be stored. A parameter value of an image filter may be calculated by calculating the color domain as hue (0 to 360) instead of the user directly inputting the parameter value. RGB data may also be used, and an interpolated image of a format, such as JPEG, BMP, or the like, in a color model, such as YCC, YUV, or the like, may be used.

A hue value may be calculated by color domain conversion from RGB to HSB as described below.

Set a Delta variable equal to [Max(r,g,b)−Min(r,g,b)]
Then Brightness=Max(r,g,b)*100/255
   If the color is (00,00,00) (black), then Saturation=0 and
      h=−1; otherwise:
Saturation=255*Delta/Max(r,g,b)
Case Max(r,g,b) is equal to the value of
Red: Set h=(Green−Blue)/Delta
Green: h=2+(Blue−Red)/Delta
Blue: h=4+(Red−Green)/Delta
Hue=h*60, if h is less than 0, we have Hue=h+360.

For YCC, a hue value may be calculated by the color domain conversion after converting YCC to RGB.

Y=0.257*R+0.504*G+0.098*B+16;
Cb=−0.148*R−0.291*G+0.439*B+128;
Cr=0.439*R−0.368*G−0.071*B+128.

For example, weather is represented by a warm color sense or a cool color sense, wherein the closer to red-yellow, the higher a percentage of the warm color sense, and the closer to blue-violet, the higher a percentage of the cool color sense.

According to an embodiment of the disclosure, for the color sense, image filters may be arranged according to colorfulness based on an achromatic color and a chromatic color. If the saturation information calculated in the equation described above is used, a degree of achromatic or chromatic color may be represented as a level value. Since a black or white color usually has a saturation value that is close to zero (0), image filters in an achromatic color group may be arranged, and since a saturation value of an image for which intensive color sense has been processed is high, image filters in a chromatic color group may be arranged.

According to an embodiment of the disclosure, for sharpness, edge detection is used. According to the edge detection, an amount of a change in brightness between two pixels is calculated, and if the amount of the change in the brightness between the two pixels is definitely greater than a certain predefined threshold limit, it may be determined that sharpness between the two pixels is high. For example, a level of sharpness may be determined by calculating a brightness difference between two pixels, i.e., a differential value of Y or brightness values of the two pixels, and comparing the calculated brightness difference with a threshold value, or the user may directly designate a numeric value. Alternatively, a level value of sharpness may be determined on an image editing menu providing level values of sharpness and the like, based on a user input.

According to an embodiment of the disclosure, for the silhouette, a histogram is used. A histogram of 0 to 255 levels is generated through distribution of contrast for each pixel, and a degree of silhouette may be determined based on pixel distribution in minimum and maximum levels. If a contrast value is intensively biased to a minimum level, and a saturated region also exists by a certain level, it may be determined that a silhouette effect is high. Alternatively, a value of a contrast level may be determined on an image editing menu providing a contrast level value, based on a user input.

Image filters may be arranged according to the silhouette. That is, the image filters may be arranged by using histogram information based on a contrast effect according to a histogram.

The image filters may be arranged using contrast information.

According to an embodiment of the disclosure, an image filter table may be generated for each group by grouping parameters defining image filters for each parameter based on a user input.

FIG. 7 illustrates an image filter table in which parameter values related to a manufacturer are grouped and managed, wherein an image filter #1 and an image filter #2 are produced by the same manufacturer according to an embodiment of the present disclosure.

Referring to FIG. 7, parameter values 720 of the image filter #1 and parameter values 730 of the image filter #2 may be grouped for parameters 710 defining each image filter and managed as an image filter table 700.

FIG. 8 illustrates an image filter table in which parameter values related to USER1 among users are grouped and managed, wherein an image filter #3 and an image filter #4 are produced by USER1 according to an embodiment of the present disclosure.

Referring to FIG. 8, parameter values 820 of the image filter #3 and parameter values 830 of the image filter #4 may be grouped for parameters 810 defining each image filter and managed as an image filter table 800.

Figure 9:
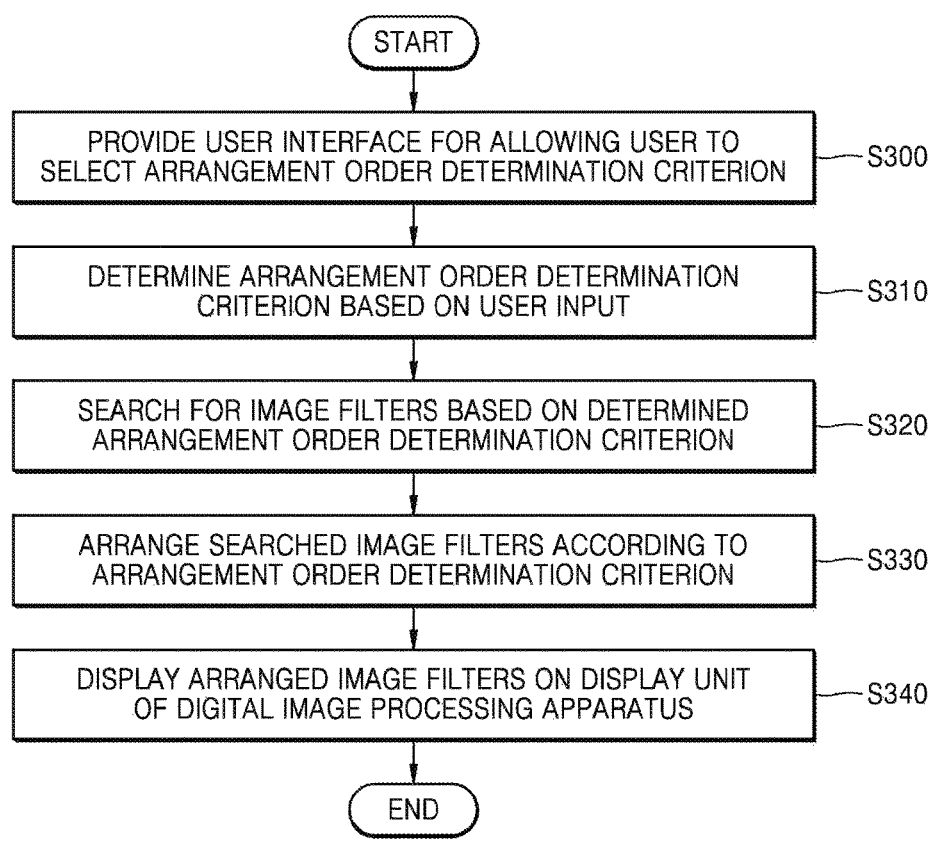
FIG. 9 is a flowchart of a method of providing a user interface for allowing a user to select an arrangement order determination criterion according to an embodiment of the disclosure.

FIG. 9 is a flowchart of a method of providing a user interface for allowing a user to select an arrangement order determination criterion according to an embodiment of the disclosure.

Referring to FIG. 9, a user interface for allowing the user to select an arrangement order determination criterion is provided in operation S300.

In operation S310, an arrangement order determination criterion is determined based on a user input. Operation S310 is substantially the same as operation S100 of FIG. 2.

In operation S320, image filters are searched for based on the determined arrangement order determination criterion. Operation S320 is substantially the same as operation S110 of FIG. 2.

In operation S330, the searched image filters are arranged according to the determined arrangement order determination criterion. Operation S330 is substantially the same as operation S120 of FIG. 2.

In operation S340, the arranged image filters are displayed on the display unit 80 of the electronic apparatus 1000. Operation S340 is substantially the same as operation S130 of FIG. 2.

Figure 10:
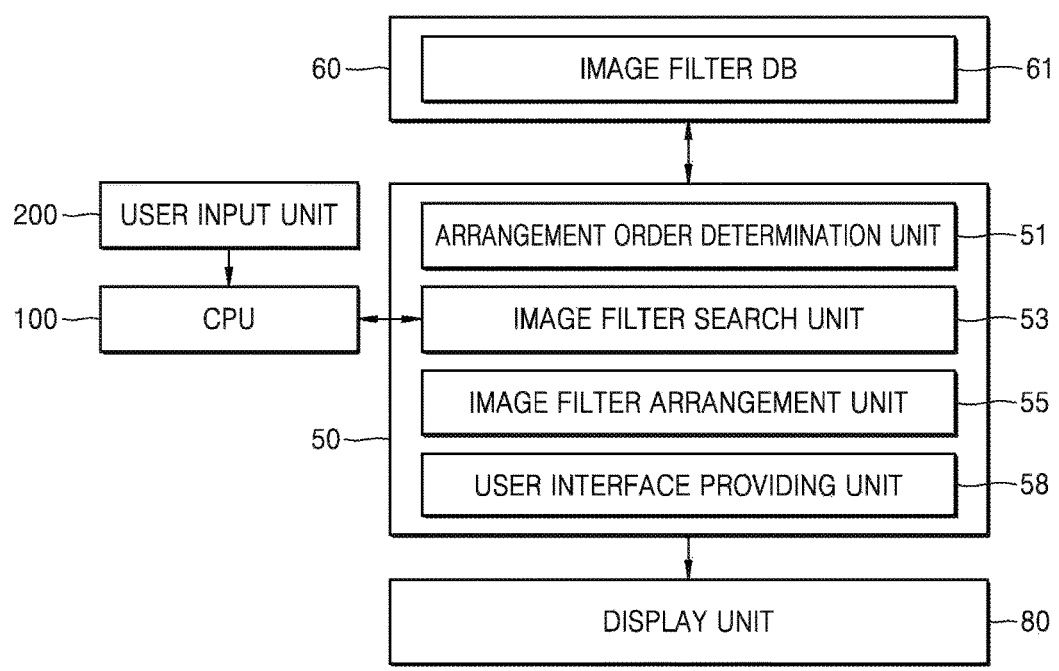
FIG. 10 is a block diagram of a digital signal processing unit in an electronic apparatus further including a user interface providing unit according to an embodiment of the disclosure.

FIG. 10 is a block diagram of a digital signal processing unit in an electronic apparatus further including a user interface providing unit according to an embodiment of the disclosure.

Referring to FIG. 10, the digital signal processing unit 50 may further include the user interface providing unit 58.

The user interface providing unit 58 provides a user interface for allowing the user to select an arrangement order determination criterion.

FIGS. 11 to 14 illustrate user interfaces according to various embodiments of the disclosure.

Figure 11:
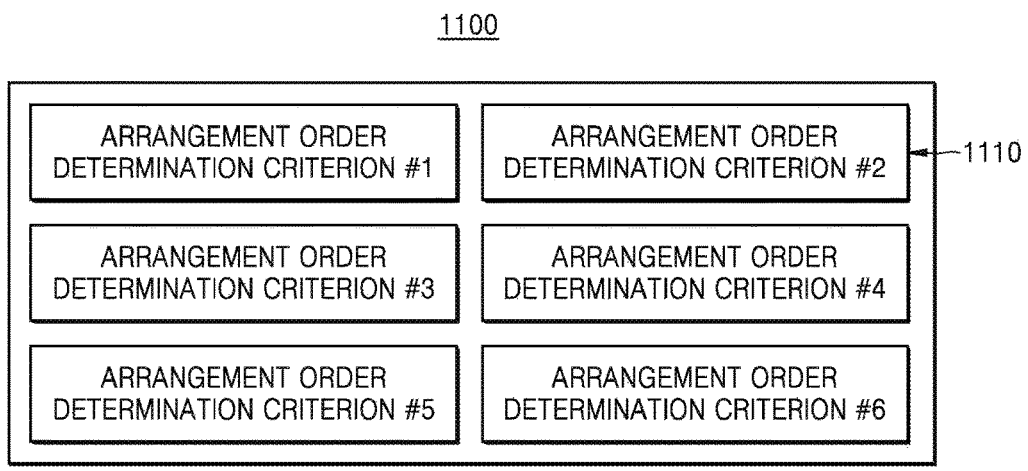
FIGS. 11 to 14 are user interface illustrations according to various embodiments of the disclosure.

FIG. 11 illustrates a user interface 1100.

Referring to FIG. 11, the user interface 1100 allows the user to select an arrangement order determination criterion 1110 and may be displayed in a text or selection bar format, wherein an arrangement order determination criterion may be selected by a key operation, a touch, or a manipulation ring of a camera lens.

Figure 12:
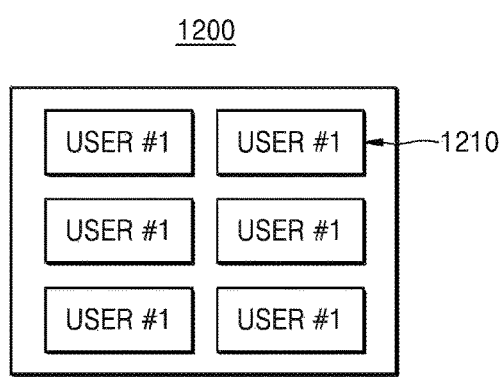

FIG. 12 illustrates a user interface 1200 for allowing the user to select an arrangement order determination criterion in a text format, wherein if the arrangement order determination criterion is a person who has generated image filters, parameter values of all users who have generated image filters are displayed. For example, image filters generated by USER #1 to USER #6 1210 may be searched for and arranged for each user. If the user selects USER #1, all image filters generated by USER #1 may be extracted from the image filter DB 61 and displayed.

Figure 13:
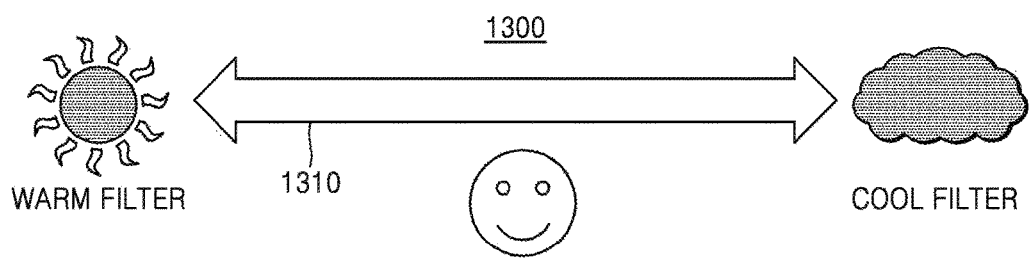

FIG. 13 illustrates a user interface 1300 for allowing the user to select an arrangement order determination criterion in a selection bar format, wherein an arbitrary position on a selection bar 1310 may be selected based on a user input, e.g., a key input or a touch input. An arrangement order determination criterion may be determined in correspondence with the selected arbitrary position.

For example, by using the selection bar 1310, image filters may be searched for based on a parameter value corresponding to an arbitrary position selected by the user with respect to a parameter of saturation defining image filters.

The searched image filters may be arranged so that an image filter having high similarity between the determined arrangement order determination criterion and a corresponding parameter value of each image filter has a high priority.

Figure 14:
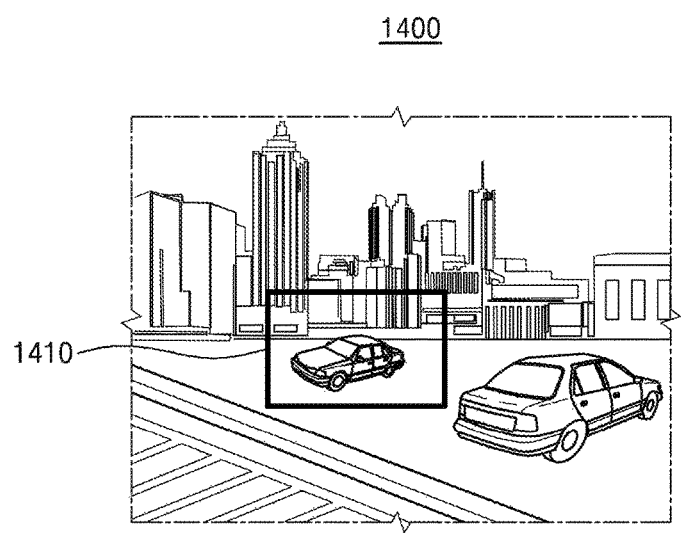

FIG. 14 illustrates a user interface 1400 in an input image format, wherein an arrangement order determination criterion is determined based on an input image selected by the user or a partial region 1410 selected by the user from an input image.

For example, if the user finds a favorite input image during web surfing, image filters having an effect similar to an effect applied to the partial region 1410 selected by the user from the input image may be searched for in the image filter DB 61 and arranged. A parameter value corresponding to a parameter defining an image filter may be extracted from the partial region 1410 and determined as an arrangement order determination criterion. The searched image filters may be arranged so that an image filter having high similarity between the determined arrangement order determination criterion and a corresponding parameter value of each image filter stored in the image filter DB 60 has a high priority and may be displayed on the display unit 80.

Figure 15:
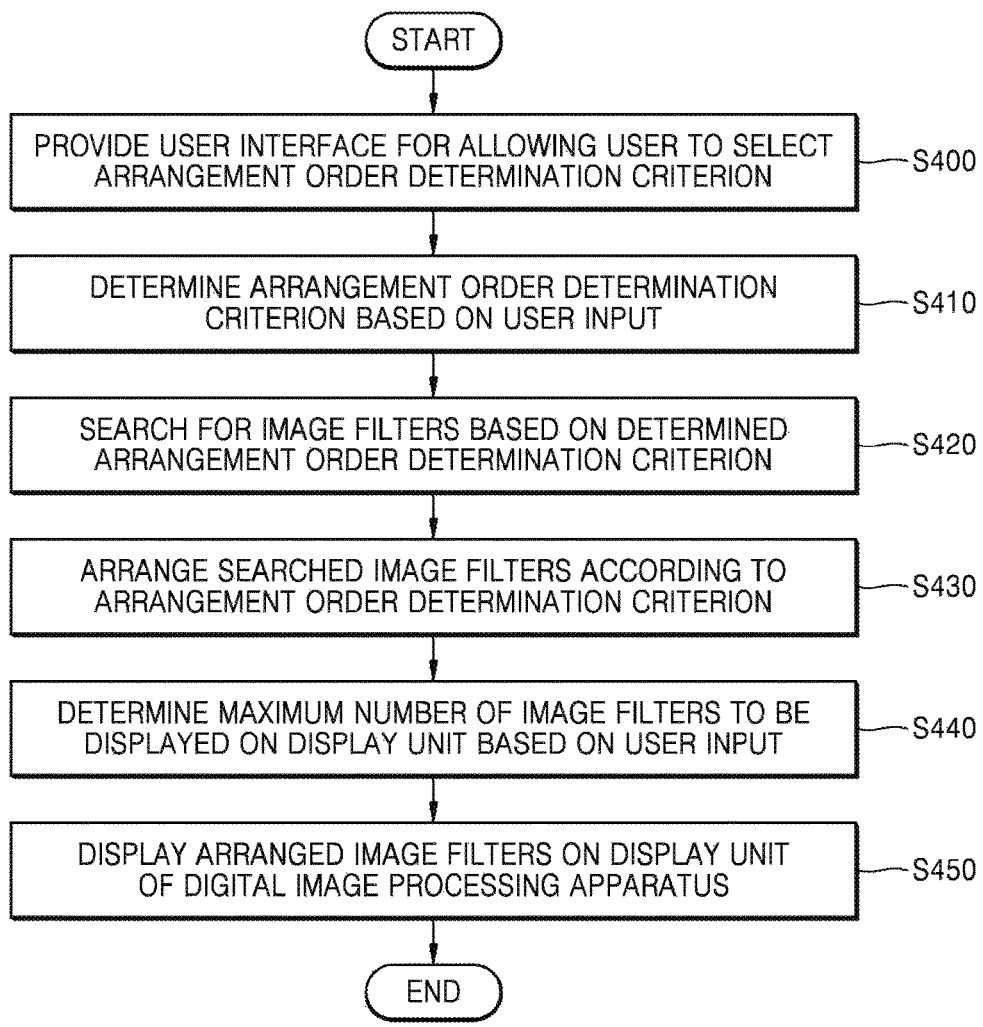
FIG. 15 is a flowchart of a method of determining a maximum number of image filters based on a user input according to an embodiment of the disclosure.

FIG. 15 is a flowchart of a method of determining a maximum number of image filters based on a user input according to another embodiment of the disclosure.

Referring to FIG. 15, a user interface for allowing the user to select an arrangement order determination criterion is provided in operation S400. Operation S400 is substantially the same as operation S300 of FIG. 9.

In operation S410, an arrangement order determination criterion is determined based on a user input. Operation S410 is substantially the same as operation S310 of FIG. 9.

In operation S420, image filters are searched for based on the determined arrangement order determination criterion. Operation S420 is substantially the same as operation S320 of FIG. 9.

In operation S430, the searched image filters are arranged according to the determined arrangement order determination criterion. Operation S430 is substantially the same as operation S330 of FIG. 9.

In operation S440, the maximum number of image filters to be displayed on the display unit 80 is determined based on the user input.

In operation S450, the arranged image filters are displayed on the display unit 80 of the electronic apparatus 1000. Operation S450 is the same as operation S340 of FIG. 9.

FIG. 16 is a block diagram of a digital signal processing unit in an electronic apparatus further including a filter number determination unit, according to another embodiment of the disclosure.

Referring to FIG. 16, the digital signal processing unit 50 may further include the filter number determination unit 59.

The filter number determination unit 59 determines through the user input unit 200 the maximum number of image filters to be displayed on the display unit 80.

Figure 17:
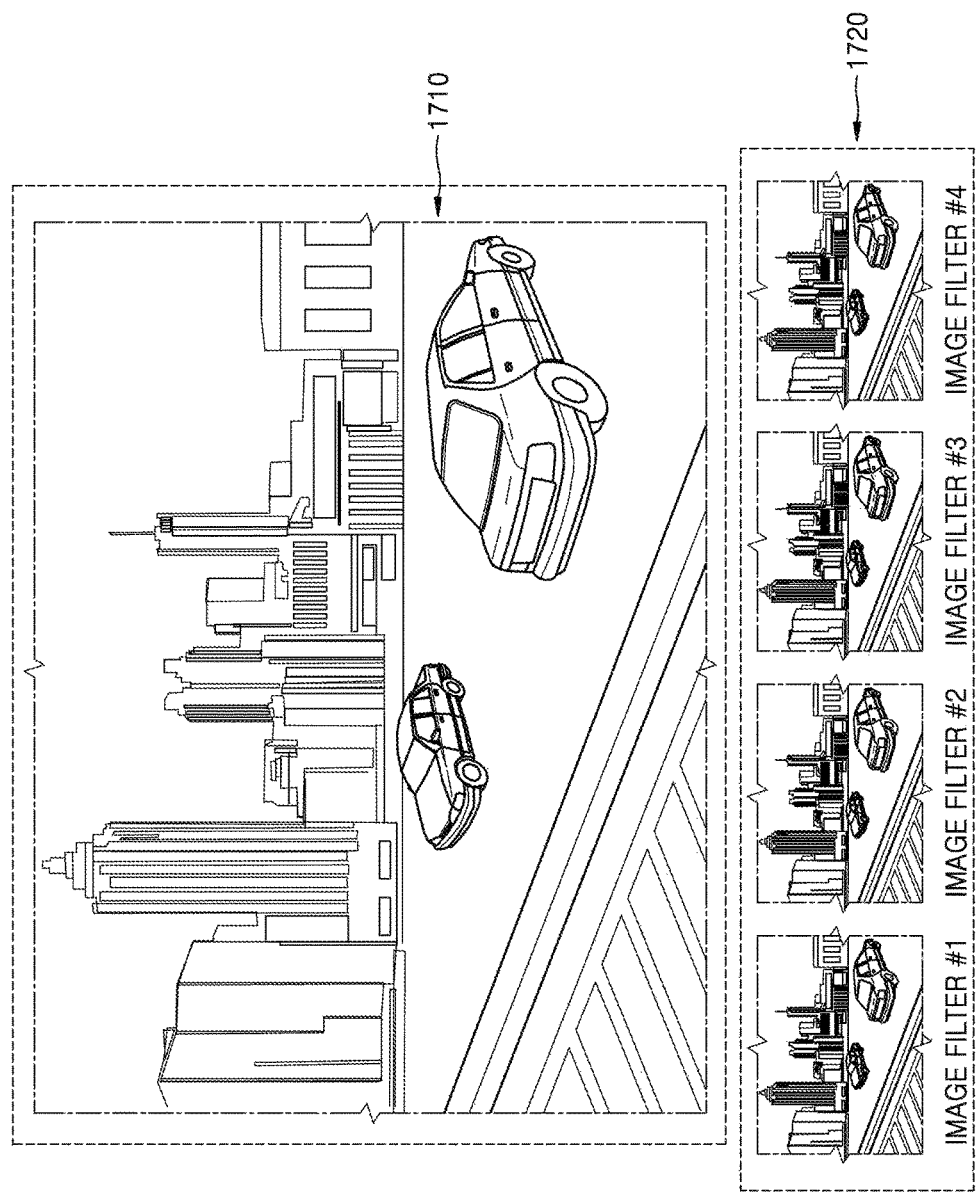
FIGS. 17 and 18 are displays illustrating displayed image filters according to various embodiments of the disclosure.
Figure 18:
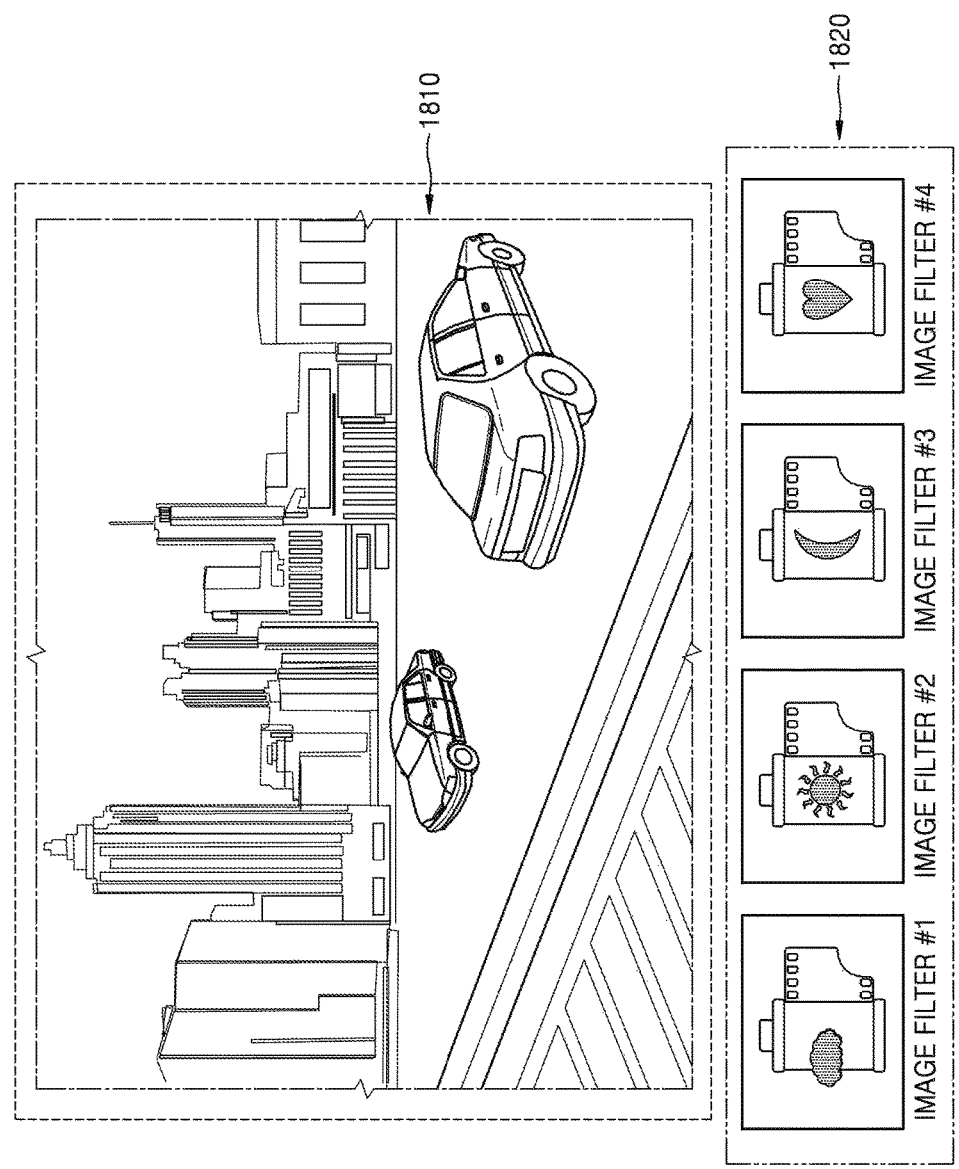

FIGS. 17 and 18 are displays illustrating displayed image filters according to various embodiments of the disclosure.

Referring to FIGS. 17 and 18, results of image filters 1720 and icons of image filters 1820 are displayed with an input image 1710 or 1810 on the display unit 80 of the electronic apparatus 1000.

The input image 1710 or 1810 indicates an image, e.g., a preview image or an image stored in the storage medium 70, displayed on the display unit 80 of the electronic apparatus 1000. The input image 1710 or 1810 may be manually input by a manipulation of the user or may be input from a web server via a network.

FIG. 17 is an example in which effects of image filters are displayed when the image filters are displayed on the display unit 80 of the electronic apparatus 1000, wherein results of the image filters 1720 image-processed by applying each image filter to an input image is used as an icon for identifying the image filter. Accordingly, since the user easily recognizes an image processing effect of each image filter, the user may easily select a desired image filter.

In addition, image filters frequently used by the user may be emphasized in a preferred or favorite icon type. For example, the image filters frequently used by the user may be identified by recommended levels 1 to 5.

Image filters frequently used by people may be checked using a server to recommend image filters in a popularity order. For example, image filters frequently used according to a gender may be classified to recommend image filters meeting a gender of the user. In another example, image filters frequently used according to an age group may be classified to recommend image filters meeting an age of the user.

FIG. 18 is an example where effects of image filters are displayed when the image filters are displayed on the display unit 80 of the electronic apparatus 1000, wherein image filters are respectively displayed as icons of image filters 1820 in a film format. For example, the user may easily recognize an effect of an image filter by also displaying a name, such as a red film, a blue film, a yellow film, a brilliant film, a mild film, a sharp film, a dark film, a bright film, an edge black film, a lighting star effect film, or the like, below the icon 1820.

FIG. 19 illustrates a user interface for generating an image filter according to an embodiment of the disclosure.

Referring to FIG. 19, the user may generate an image film by using the user interface 1900 provided by the electronic apparatus 1000. The user interface 1900 may generate parameters defining the image filter based on a user input and allow the user to input corresponding parameter values.

For example, the parameters defining the image filter may include setting items to be used for photographing or other various operations of the electronic apparatus 1000.

Parameters 1910 defining the image filter may include bibliographic items for defining the image filter. For example, "title" is a name of the image filter which may be input in a text format based on a user input, and "abstract" may include a brief description of the image filter based on a user input.

In addition, "image" is a representative image capable of representing an image processing effect of the image filter, wherein an image stored in the electronic apparatus 1000 may be uploaded, or a new image may be captured by the electronic apparatus 1000.

In addition, "recommended condition" may be an arrangement order determination criterion of the image filter. For example, the arrangement order determination criterion of the image filter may be determined based on a subject, such as a person, a landscape, an animal, or the like, in an input image. The arrangement order determination criterion of the image filter may be determined based on a time band in which the input image is captured. The arrangement order determination criterion of the image filter may be determined based on preference according to a gender, such as female preference (%) or male preference (%), preference according to an age group, such as people in their teens, twenties, thirties, or the like, or the like.

In addition, an image processing effect corresponding to the image filter set by the user may influence both input images before and after photographing, according to parameters defining the image filter and parameter values corresponding to the image filter.

For example, when the image processing effect of the image filter influences the imaging before photographing, parameters 1920 defining the image filter may include at least one selected from the group consisting of a shutter speed, an iris value, a color temperature, a photographing mode, white balance, exposure correction, color correction, flash light intensity adjustment, sensitivity adjustment, electronic zoom, a focal area change, and the like.

When the image processing effect of the image filter influences the imaging after photographing, at least one selected from the group consisting of a pre-processing process and a post-processing process of a digital image acquired by the photographing may be included.

For example, parameters 1930 defining the image filter associated with the pre-processing process may include a synthesis method through continuous photographing with a high ISO number for correcting shaking, an HDR method of a multi-sheet method for improving a dynamic range under a backlight condition, and the like.

In addition, parameters 1940 defining the image filter associated with the post-processing process may include saturation, sharpness, brightness, contrast, Kelvin for white balance, an exposure value, hue, and the like. The parameters 1940 defining the image filter associated with the post-processing process may further include the HDR method capable of applying a dynamic range as one sheet, blurring using a Gaussian filter capable of removing blemishes on a face, and the like. When the parameters 1940 defining the image filter associated with the post-processing process are set, after setting the parameters 1940, parameter values corresponding to the parameters 1940 may be adjusted.

For example, if saturation is one of the parameters 1940 defining the image filter related to the post-processing process of the user interface 1900 and is selected based on a user input, a user interface in a selection bar format by which the intensity of colors may be adjusted may be additionally displayed. The user may set a parameter value corresponding to the saturation through the displayed user format in a selection bar format. According to an embodiment of the disclosure, an arrangement order determination criterion is determined based on a user input, image filters are searched for based on the determined arrangement order determination criterion, the searched image filters are arranged according to the arrangement order determination criterion and suggested to the user, to thereby allow the user to easily find a desired image filter, and thus reduce a search time.

In addition, since visually similar image filters are displayed in a group, the user may simply and intuitively select an image filter according to a request of the user.

According to an embodiment of the disclosure, provided is a method of arranging image filters by providing a user interface for allowing the user to select a desired image filter type, to thereby allow the user to easily and quickly search for and arrange various image filters desired by the user.

An apparatus according to various embodiments of the disclosure may include a processor, a memory for storing and executing program data, a permanent storage such as a disk drive, and a user interface, such as a touch panel, keys, and buttons.

Methods implemented with a software module or an algorithm may be stored in a computer-readable recording medium in the form of computer-readable codes or program instructions executable in the processor. Examples of the computer-readable recording medium include magnetic storage media (e.g., ROM, RAM, floppy disks, hard disks, etc.) and optical recording media (e.g., compact disc-ROMs (CD-ROMs), digital versatile discs (DVDs), etc.). The computer-readable recording medium can also be distributed over network-coupled computer systems so that the computer-readable code is stored and executed in a distributed fashion. The media may be read by a computer and executed by the processor.

All cited references including publicized documents, patent applications, and patents cited in the disclosure can be merged in the disclosure in the same manner as the shown by individually and concretely merging each cited reference and the shown by generally merging each cited reference in the disclosure.

For understanding of the disclosure, reference numerals are disclosed in the various embodiments shown in the drawings, and specific terms are used to describe the various embodiments of the disclosure. However, the disclosure is not limited by the specific terms, and the disclosure may include all components, which can be commonly thought by those of ordinary skill in the art. The disclosure can be represented with functional blocks and various processing operations. These functional blocks can be implemented by various numbers of hardware and/or software configurations for executing specific functions. For example, the disclosure may adopt direct circuit configurations, such as a memory, processing, logic, and look-up tables, for executing various functions under control of one or more processors or by other control devices. Like components of the disclosure being able to execute the various functions with software programming or software elements, the disclosure can be implemented by a programming or scripting language, such as C, C++, Java, or assembler, with various algorithms implemented by a combination of a data structure, processes, routines, and/or other programming components. Functional aspects can be implemented with algorithms executed in one or more processors. In addition, the disclosure may adopt the prior art for an electronic environment setup, signal processing and/or data processing. The terms, such as "mechanism", "element", "means", and "configuration", can be widely used and are not delimited as mechanical and physical configurations. The terms may include the meaning of a series of routines of software in association with a processor.

Specific executions described above are various embodiments and do not limit the scope of the disclosure even in any method. For conciseness of the specification, disclosure of electronic configurations according to the related art, control systems, software, and other functional aspects of the systems may be omitted. In addition, connections or connection members of lines between components shown in the drawings illustrate functional connections and/or physical or circuit connections, and the connections or connection members can be represented by replaceable or additional various functional connections, physical connections, or circuit connections in an actual apparatus. In addition, if there is no concrete use of terms such as "requisite" or "important" to refer a component, that component may not be necessarily required for application of the disclosure.

The use of the term "said" or a similar directional term in the specification (in particular, in claims) of the disclosure may correspond to both the singular and the plural. In addition, when a range is disclosed in the disclosure, disclosures to which individual values belonging to the range are applied are included (if there is no disclosure opposed to this), and this is the same as if each of the individual values forming the range is disclosed in the detailed description of the disclosure. Finally, for operations forming the methods according to the disclosure, if an order is not clearly disclosed or, if there is no disclosure opposed to the clear order, the operations can be performed in any order deemed proper. The disclosure is not necessarily limited to the disclosed order of the operations. The use of all illustrations or illustrative terms (for example, and so forth, etc.) in the disclosure is simply to describe the disclosure in detail, and the scope of the disclosure is not limited due to the illustrations or illustrative terms unless they are limited by the claims. In addition, it will be understood by those of ordinary skill in the art that various modifications, combinations, and changes can be formed according to design conditions and factors within the scope of the attached claims or the equivalents.

In addition, other various embodiments of the disclosure can also be implemented through computer-readable code/instructions in/on a medium, e.g., a computer-readable medium, to control at least one processing element to implement any above-described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be such a defined and measurable structure including or carrying a signal or information, such as a device carrying a bitstream according to various embodiments of the disclosure. The media may also be a distributed network, so that the computer-readable code is stored/transferred and executed in a distributed fashion. Furthermore, the processing element could include a processor or a computer processor, and processing elements may be distributed and/or included in a single device.

It should be understood that the various embodiments described therein should be considered in a descriptive sense only and not for purposes of limitation. Descriptions of features or aspects within each embodiment should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of arranging image filters, the method comprising:
   extracting a parameter value from an input image selected by a user or a partial region selected by the user from the input image;
   determining an arrangement order determination criterion based on the parameter value;
   searching for image filters based on the arrangement order determination criterion;
   arranging the searched image filters according to the arrangement order determination criterion; and
   displaying the arranged image filters on a display of an electronic apparatus,
   wherein the parameter value is one selected from the group consisting of a hue value, a saturation value, a brightness value, a sharpness value, a contrast value, a white balance value, an exposure value, or any combination thereof, and
   wherein the searching for the image filters based on the arrangement order determination criterion comprises searching for image filters having parameter values corresponding to the arrangement order determination criterion.

2. The method of claim 1, wherein the determining of the arrangement order determination criterion comprises determining an arrangement order of the searched image filters based on parameter values defining each image filter.

3. The method of claim 1, further comprising providing a user interface for allowing the user to select the arrangement order determination criterion.

4. An apparatus for processing a digital image, the apparatus comprising:
   a digital signal processor configured to:
   extract a parameter value from an input image selected by a user or a partial region selected by the user from the input image,
   determine an arrangement order determination criterion based on the parameter value,
   search for image filters based on the arrangement order determination criterion, and
   arrange the searched image filters according to the arrangement order determination criterion; and
   a display configured to display the arranged image filters,
   wherein the parameter value is one selected from the group consisting of a hue value, a saturation value, a brightness value, a sharpness value, a contrast value, a white balance value, an exposure value, or any combination thereof, and
   wherein the digital signal processor is further configured to search for image filters having parameter values corresponding to the arrangement order determination criterion.

5. The apparatus of claim 4, wherein the digital signal processor is further configured to determine an arrangement order of the searched image filters based on parameter values defining each image filter.

6. The apparatus of claim 4, wherein the digital signal processor is further configured to provide a user interface for allowing the user to select the arrangement order determination criterion.

7. The apparatus of claim 4, wherein the digital signal processor is further configured to arrange the searched image filters so that an image filter having a high similarity between the arrangement order determination criterion and parameter values corresponding to each image filter has a high priority.

8. The apparatus of claim 4, wherein the digital signal processor is further configured to determine a maximum number of image filters to be displayed on the display based on the user input.

9. The apparatus of claim 4, wherein the display is further configured to display the image filters with effects thereof.

10. An apparatus for processing a digital image, the apparatus comprising:
    a digital signal processor configured to:
    determine an arrangement order determination criterion based on a parameter value,
    search for image filters based on the arrangement order determination criterion, and
    arrange the searched image filters according to the arrangement order determination criterion; and
    a display configured to display the arranged image filters,
    wherein the digital signal processor is further configured to generate an image filter based on the parameter value set by a user, and arrange image filters so that the image filter generated by the user has a high priority if the arrangement order determination criterion is associated with the user,
    wherein the parameter value is one selected from the group consisting of a hue value, a saturation value, a brightness value, a sharpness value, a contrast value, a white balance value, an exposure value, or any combination thereof, and
    wherein the digital signal processor is further configured to search for image filters having parameter values corresponding to the arrangement order determination criterion.

11. A non-transitory computer-readable storage medium storing therein computer program codes, which when read and executed by a processor, perform a method of arranging image filters, the method comprising:
    extracting a parameter value from an input image selected by a user or a partial region selected by the user from the input image;
    determining an arrangement order determination criterion based on the parameter value;
    searching for image filters based on the arrangement order determination criterion;
    arranging the searched image filters according to the arrangement order determination criterion; and
    displaying the arranged image filters on a display of an electronic apparatus,
    wherein the parameter value is one selected from the group consisting of a hue value, a saturation value, a brightness value, a sharpness value, a contrast value, a white balance value, an exposure value, or any combination thereof, and wherein the searching for the image filters based on the arrangement order determination criterion comprises searching for image filters having parameter values corresponding to the arrangement order determination criterion.

12. The non-transitory computer-readable storage medium of claim 11, wherein the determining of the arrangement order determination criterion comprises determining an arrangement order of the searched image filters based on parameter values defining each image filter.

13. The non-transitory computer-readable storage medium of claim 11, wherein the determining of the arrangement order determination criterion comprises determining the arrangement order determination criterion based on the input image selected by the user or a partial region selected by the user from the input image.

14. The non-transitory computer-readable storage medium of claim 11, wherein the method further comprises providing a user interface for allowing the user to select the arrangement order determination criterion.

* * * * *